United States Patent

Layton

[15] 3,687,158

[45] Aug. 29, 1972

[54] FLUID FLOW RATE SENSOR
[72] Inventor: Howard M. Layton, Pound Ridge, N.Y.
[73] Assignee: Interlab, Inc., Pleasantville, N.Y.
[22] Filed: April 21, 1971
[21] Appl. No.: 136,052

[52] U.S. Cl. ................................................137/551
[51] Int. Cl. .............................................F16k 37/00
[58] Field of Search ...............137/551, 554, 558, 559

[56] References Cited

UNITED STATES PATENTS 3,606,912   9/1971   Fox.............................137/559

*Primary Examiner*—Henry T. Klinksiek
*Attorney*—Michael Ebert

[57] ABSTRACT

A process fluid flow-rate sensor adapted to actuate a control circuit or an alarm when the sensed rate falls below or exceeds the critical limits of a predetermined range. The sensor includes a leak chamber operating in conjunction with a main drain line, in an arrangement in which the fluid to be sensed first flows into the leak chamber. The leak chamber has an orifice through which fluid passes therefrom through a leak tube into the main drain line. The arrangement is such that should the flow rate be above a critical minimum value, the filling rate in the chamber will exceed the leakage rate thereof whereby after the leak chamber is completely filled, the fluid then directly passes into the main drain line, whereas when the flow rate falls below the critical minimum value, the leak chamber empties. Mounted for vertical movement in the leak chamber is a float provided with a switch actuator. The float, when the leak chamber undergoes depletion as a result of a flow rate below the minimum critical value, drops to a point at which the switch actuator trips an associated switch to actuate an alarm or control circuit. To sense a flow rate exceeding the maximum critical limit, the switch is arranged to respond to an elevated float position reflecting this condition.

8 Claims, 3 Drawing Figures

INVENTOR.
HOWARD M. LAYTON
BY
ATTORNEY

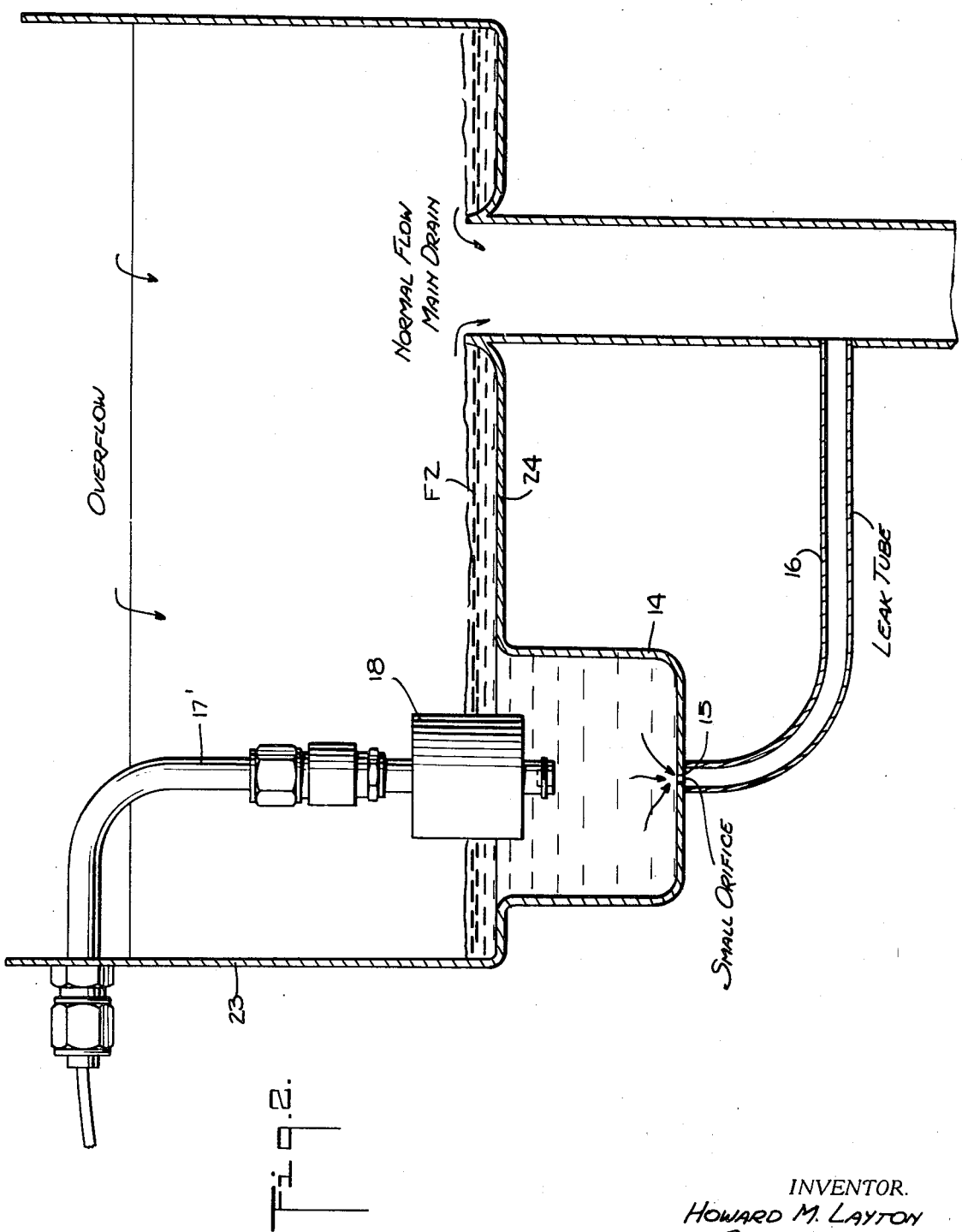

FLUID FLOW RATE SENSOR

BACKGROUND OF THE INVENTION

This invention relates generally to fluid flow-rate sensors adapted to actuate a switching circuit or alarm when the sensed rate falls below or exceeds the limits of a predetermined range, and more particularly to a flow-rate sensor making use of a float assembly to detect liquid flow rate.

In certain applications, it is necessary to actuate a switch, an alarm, or a control device in the event an unacceptable variation occurs in the rate of liquid flow. For example, a heated process having a heavy flow rate requires the use of a heating system of relatively high capacity. It is necessary, therefore, as a safety measure, to de-activate the heating system in the event the processing liquid stops flowing or drops below a certain flow rate.

The conventional flow-rate sensor for this purpose takes the form of an in-line flow switch, incorporating springs or diaphragms which are deflected as a function of flow rate and serve to actuate a switch when the rate is outside of a prescribed range. Though flow-rate sensors of this type are satisfactory in most applications, there are negative factors which limit the value of such sensors in specialized applications, particularly those involving a process calling for a fluid of high purity, as in the case of food processing, in the processing of medicinal and pharmaceutical fluids and in micro-electronics. By way of example, the present invention will be described in the context of a micro-electronics process, but it is to be understood that a fluid sensor in accordance with the invention is not limited to this application.

The creation of micro-electronic devices entails the preparation of perfectly clean metallic surfaces so that further metallic layers may be deposited or diffused into the substrate metal itself. Since a complex device may have to be discarded because of the failure of any one element within the device, in order to obtain a high production yield it is vital that preparatory cleaning procedures remove all dirt, grease and other foreign matter that might otherwise give rise to a defective element. Critical cleaning steps are involved, as for example, cleaning prior to etching of semiconductor substrates. If the cleaning process is carried out imperfectly, the etching will be impaired and the yield will be poor.

To accomplish this purpose, elaborate washing, rinsing and drying techniques have been developed. Associated with these processes are particle-filtration systems which serve to remove insoluble contaminants from the process fluid down to a fraction of a micron diameter.

Heretofore it has been the practice to insert flow-rate switches of conventional design in the pressurized liquid line supplying the cleaning fluid. Even if the flow-rate switch is constructed of carefully selected material compatible with the process fluid, the switch may nevertheless be a source of contamination. Thus in a micro-electronics process, though the fluid system may include high-grade filters to remove contaminants, the inevitable existence of crevices in an in-line flow-rate switch causes contaminants to lodge therein and to accumulate in an environment in which micro-organisms may flourish.

Hence, in-line flow-rate sensors of the commercially available type are objectionable in micro-electronic applications as well as in other situations where even the slightest contamination of the fluid being sensed cannot be tolerated.

SUMMARY OF INVENTION

In view of the foregoing, the main object of this invention is to provide a flow-rate sensor which makes use of a gravity-operating device inserted into the open drain line of the process, rather than into the pressurized supply line therefor.

A significant advantage of the invention is that the sensor functions independently of supply pressure and is strictly dependent on flow rate, assuming a fluid of constant density and viscosity. Also, an advantage of the invention is that the sensor, since it is interposed in the drain on the effluent side of the process, is incapable of contaminating the influent process fluid.

Yet another object of the invention is to provide a low-cost, simple and reliable flow sensor which effectively operates on a "pilot" fluid supply and therefore can be made highly sensitive to low-flow rates without influencing the operating system capacity.

Briefly stated, these objects are accomplished in a flow-rate sensor including a leak chamber operating in conjunction with a main drain line in an arrangement wherein effluent fluid in a process first flows into a leak chamber having a leak orifice serving to leak fluid into the main drain line. The arrangement is such that should the flow rate exceed a minimum critical value, the chamber will fill more quickly than the rate at which it is depleted by the orifice, whereby when the chamber is completely filled, the fluid then passes directly into the drain line, but when flow rate falls below the minimum critical value, the chamber empties.

Mounted for vertical movement in the chamber is a float including a switch actuator. When the leak chamber empties as a result of a flow rate below the minimum critical value, the float falls to a point at which its switch actuator trips an associated switch to actuate an alarm or control circuit.

To sense a flow rate above a maximum critical value, the switch is arranged to respond to an elevated float position reflecting this condition.

OUTLINE OF DRAWING

For a better understanding of the invention, as well as other objects and further features thereof, reference is made to the following detailed description to be read in conjunction with the accompanying drawing, wherein:

FIG. 1 schematically illustrates one preferred embodiment of a flow-rate sensor in accordance with the invention;

FIG. 3 shows a third embodiment of the invention.

DESCRIPTION OF INVENTION

Figure 1:
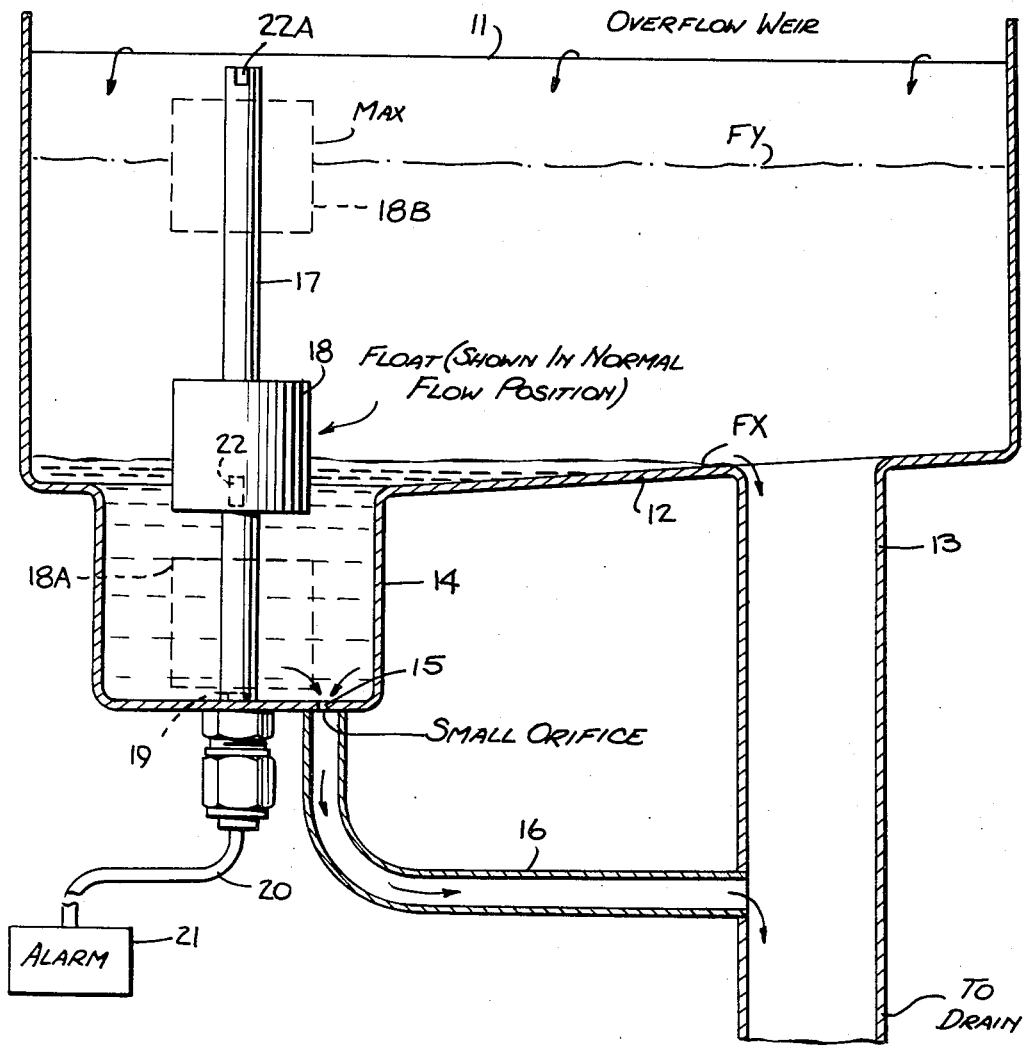

Referring now to the drawings and more particularly to FIG. 1, there is shown a process vessel 10 for cleaning micro-electronic devices or for any other purpose.

In the process vessel, effluent water of high purity flows over a weir 11 into the overflow or weir section of the vessel. This section is provided with a sloped base 12.

Adjacent the high end of sloped base 12 and communicating with the overflow section, is a downwardly extending main drain pipe 13. Formed adjacent the low end of the sloped base is a well 14, acting as a leak chamber 14. At the bottom of chamber 14 is a small orifice 15, serving as an inlet to a leak tube 16, intercoupling leak chamber 14 with drain pipe 13. Leak chamber 14 drains into the main drain pipe at a rate determined by the diameter of orifice 15.

Vertically mounted at a central position within leak chamber 14 is a hollow post 17, supporting a cylindrical float 18 of buoyant material. Disposed within the foot of post 17 at the bottom of leak chamber 14 is a magnetically-actuated reed switch 19, whose contacts are connected to a cable 20, leading to a remote alarm or control circuit 21.

Disposed within float 18 is a permanent magnetic actuator 22, so arranged that when float 18 is at its lowermost position on post 17, actuator 22 is in close proximity to reed switch 19 and causes this normally open switch to close, thereby setting off an alarm or initiating a control action appropriate to the condition sensed by the float. While a magnetically-operated switch is shown, it will be obvious that other arrangements are also feasible such as mechanically or inductively actuated switches.

Because of the sloped bottom wall 12 of the process vessel, most of the overflow fluid tends to first enter leak chamber 14 and to fill this chamber before flowing into and running down main drain pipe 13. If the rate of flow of the process fluid is just sufficient to maintain the leak chamber full, despite the continuous loss of fluid through small orifice 15, then the level of fluid, as indicated by wavy-line FX in the tank, will about reach the high end of the tank bottom. In this condition, which may be said to be above the "critical" value of minimum flow rate, the float 18 will by buoyed by fluid level FX to a raised position well above the foot of post 17.

This normal operating condition will prevail at all flow rates greater than the minimum critical flow rate, and the flow-sensing assembly and leak chamber will in no way interfere with the full drainage of the process vessel through the main drain pipe 13. Inasmuch as the flow-rate sensor is not interposed in the supply line feeding fluid into the process tank, but is placed in the overflow section of the tank, it is incapable of contaminating the fluid used for the process.

When, however, fluid flows over weir 11 at a rate below the minimum critical flow rate, leakage through orifice 15 in leak chamber 14 will then exceed the flow of fluid into this chamber, hence float 18 will sink to its lowermost position, as indicated in dashed lines by float 18A, thereby actuating switch 19 and causing the alarm or control circuit to operate. Thus the sensor functions to trip the alarm or control switch when flow is below the critical value.

The float-type sensor, since it is not in the fluid supply lines, but in the overflow section of the process vessel, functions independently of source pressure. Assuming that the density and viscosity of the fluid are constant, which generally is the case, it will be evident that the operation of the sensor depends exclusively on flow rate and no other variable. Hence, should the process make use of electrical heaters, the control system associated with the sensor may be used to shut off the heater in the event the flow rate falls below the critical value. Alternatively, the control device could be used to bring about an increase in fluid pressure, to cause the flow rate to rise above the minimum critical value. In any event, the alarm operated by the sensor switch will call attention to an abnormal condition.

The minimum critical flow rate for a given system is readily established by adjustment of the size of the leak orifice. For any given set of parameters (material thickness, liquid density and viscosity), an appropriate graph may be drawn relating orifice diameter to critical flow rate.

As pointed out previously, when the flow rate falls below the critical value, then the rate at which leak chamber 14 is being filled is slower than the rate at which it is being emptied through orifice 15, hence the fluid level in the chamber proceeds to drop.

The amount of time it takes to deplete the fluid in the leak chamber when the flow rate is below the critical value depends on several variables, such as the capacity of the chamber and the degree to which flow rate is below critical value. Since it will then take finite time for the fluid to be depleted and for float 18 to reach the point at which sensor switch 19 is actuated, this intrinsic time delay can be exploited to prevent the switch from being triggered by transients.

Thus in systems operating fairly close to the critical flow rate and subject to sporadic or intermittent variations in flow rate, the delay introduced by the leak chamber may be made such as to render the system insensitive to unimportant transients in flow rate. To increase the inherent delay of the sensor, the leak chamber may be made deeper and the float support assembly longer.

Instead of employing a fixed orifice 15 for the leak chamber, a variable orifice could be used. This may take the form of an iris mechanism or a row of holes covered by a sliding shutter. If a remote control mechanism were attached to adjust these control elements, as desired by a process operator, the addition of a calibrated scale would then permit the system to be used as a means of measuring actual operating flow. Or the orifice may be in the form of an adjustable valve calibrated in terms of flow rate.

To extend the usefulness of the invention to provide alarm or control intelligence at a maximum critical flow rate as well as at a minimum critical flow rate, the float support assembly may be extended in length to permit the float itself to rise up above the leak chamber and well into the weir section, as shown by float 18B in dashed lines. Then if the operating flow rate should become great enough to exceed the capacity of the main drain line 13, the weir chamber itself would begin to fill with fluid to the level indicated by wavy line FY, and the float would rise up the float post to actuate a second magnetic reed switch 22A, adjacent the top of the post which would in turn actuate a second alarm or control circuit.

The invention has the advantages of simplicity and accessibility, and because it operates on a "pilot" fluid supply, it can be made very sensitive to low flow rates without influencing the overall system capacity. Further, in applications where the risk of contamination is a major factor, the ready removability of the major components for cleaning is obviously of value. There are also many applications wherein the fact that the sensing system is at the effluent end of the process instead of at the pressurized influent end, avoids the contamination risk entirely.

Figure 2:
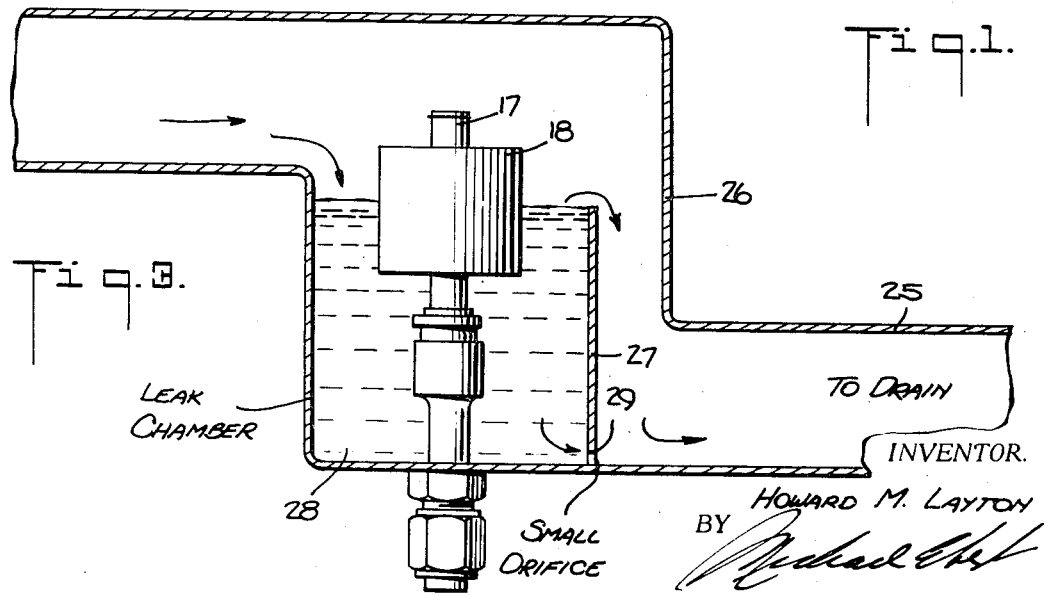
FIG. 2 illustrates a second embodiment of the invention.

Referring now to FIG. 2, there is shown a modified form of the same system illustrated in FIG. 1 which operates on essentially the same principles. However, instead of mounting the supporting post at the bottom on the leak chamber, the post 17' in FIG. 2 is suspended from a bracket 22 mounted on the side wall 23, of the weir chamber, the post extending into the leak chamber.

In this hanging float arrangement, the bottom wall 24 of the weir chamber is not sloped, but is level, and the inlet to the main drain pipe 13 is raised somewhat above the bottom wall so that when the flow rate is above the minimum critical value FZ, float 18 is displaced from the lower end of the post. But when the flow rate is below this critical value, float 18 sinks into leak chamber 14 to a point in proximity to reed switch 19 to actuate an alarm or control circuit associated therewith.

Still another embodiment of the invention is shown in FIG. 3 wherein a drain line 25 having a Z formation, is provided with an elbow 26 containing a partition 27 to define a leak chamber 28, having an orifice 29 leading to the downstream end of the line. In this leak chamber, there is installed a float and post assembly of the type shown in FIG. 1.

While there have been shown and described preferred embodiments of fluid-rate sensors in accordance with the invention, it will be appreciated that many changes and modifications may be made therein without, however, departing from the essential spirit of the invention.

I CLAIM:

1. In a process wherein an effluent fluid is discharged through a drain line, a flow-rate sensor comprising:
   A. a leak chamber having an orifice to drain fluid from the chamber,
   B. a leak tube coupling the orifice to said drain line,
   C. means feeding said effluent into said leak chamber to cause said chamber to fill more quickly than the rate at which it is depleted by the orifice therein when the flow rate of the effluent exceeds a minimum critical value, whereby when the chamber is completely filled, the excess fluid then passes directly into the drain line but when the flow rate falls below said critical value, the chamber proceeds to empty,
   D. a float disposed for vertical movement in said chamber, said float falling to a predetermined point when the chamber empties, and
   E. means responsive to the float position to effect a switching action when the float reaches said predetermined point.

2. A flow-rate sensor as set forth in claim 1, wherein said effluent fluid flows from a process chamber over an overflow weir into a weir chamber whose bottom wall has a depression to define said leak chamber, said bottom wall being sloped and having said drain line coupled thereto.

3. A flow-rate sensor as set forth in claim 2, wherein said float is supported for vertical movement on a post mounted in said leak chamber, 4. A flow-rate sensor as set forth in claim 2, wherein said means responsive to the float position is constituted by a magnetically-actuated switch disposed at the bottom of the post, and a magnet actuator disposed in the float, whereby when the float is at said point, said switch is actuated.

5. A flow-rate sensor as set forth in claim 4 further including an alarm circuit coupled to said switch and activated thereby.

6. A flow-rate sensor as set forth in claim 4, further including a second switch disposed at the top of the post to sense flow rates above a critical maximum value.

7. A flow-rate sensor as set forth in claim 2, wherein said float is supported for vertical movement on a post mounted on the side of said weir chamber and extending into the leak chamber.

8. A flow-rate sensor as set forth in claim 1, wherein said effluent is fed into a stepped drain line whose elbow has a partition therein to define said leak chamber, said partition having an orifice to drain effluent from the chamber into the drain line.

* * * * *